(12) United States Patent
Nakahashi et al.

(10) Patent No.: US 9,427,919 B2
(45) Date of Patent: Aug. 30, 2016

(54) OPTICAL ELEMENT PRODUCING DEVICE, OPTICAL ELEMENT PRODUCING METHOD, CONTROLLING PROGRAM, AND RECORDING MEDIUM

(71) Applicant: SHARP KABUSHIKI KAISHA, Osaka (JP)

(72) Inventors: Takahiro Nakahashi, Osaka (JP); Hiroyuki Hanato, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 990 days.

(21) Appl. No.: 13/628,506

(22) Filed: Sep. 27, 2012

(65) Prior Publication Data

US 2013/0082411 A1  Apr. 4, 2013

(30) Foreign Application Priority Data

Sep. 30, 2011  (JP) .................................. 2011-218368

(51) Int. Cl.
*B29D 11/00* (2006.01)
*B29C 43/58* (2006.01)

(52) U.S. Cl.
CPC ................. *B29D 11/00* (2013.01); *B29C 43/58* (2013.01); *B29C 2043/5808* (2013.01); *B29C 2043/5833* (2013.01)

(58) Field of Classification Search
CPC ............ B29C 43/58; B29C 2043/5808; B29C 2043/5833; B29D 11/00
See application file for complete search history.

(56) References Cited

U.S. PATENT DOCUMENTS 3,380,718 A * 4/1968 Neefe .............. B29D 11/00009
264/2.2
2010/0289161 A1* 11/2010 Yamada ................ B29C 37/005
264/1.1

FOREIGN PATENT DOCUMENTS

| EP | 2 327 527 A1 | 6/2011 |
| JP | 62-220308 A | 9/1987 |
| JP | 2008-183827 | 8/2008 |
| JP | 2009-190250 | 8/2009 |
| WO | 2010/035540 A1 | 4/2010 |

* cited by examiner

*Primary Examiner* — Mathieu Vargot
(74) *Attorney, Agent, or Firm* — Nixon & Vanderhye P.C.

(57) ABSTRACT

When an optical element is produced by sandwiching a resin between a pair of molds, the resin is cured while a mold is kept in contact with the resin until the temperature of the resin reaches a gel point. Throughout the process, a load cell monitors pressure exerted to the mold. After detection of a state in which the pressure exerted to the mold is a negative pressure, the resin is cured while the position of the mold is controlled so that the pressure exerted to the mold is increased to a predetermined positive pressure and thereafter the positive pressure is maintained.

3 Claims, 4 Drawing Sheets

OPTICAL ELEMENT PRODUCING DEVICE, OPTICAL ELEMENT PRODUCING METHOD, CONTROLLING PROGRAM, AND RECORDING MEDIUM

This Nonprovisional application claims priority under 35 U.S.C. §119 on Patent Application No. 2011-218368 filed in Japan on Sep. 30, 2011, the entire contents of which are hereby incorporated by reference.

TECHNICAL FIELD

The present invention relates to an optical element producing device and an optical element producing method, each of which is for producing an optical element part of which is a resin to which a desired optical functional surface has been transferred.

BACKGROUND ART

There has conventionally been a technique for use in a device for shaping a resin by sandwiching the resin between molds, which technique is for controlling displacement of the molds. According to such a technique, driving force for the molds is controlled by for example controlling the position and/or the speed of a drive shaft, controlling time with use of a timer, or controlling temperatures.

Patent Literature 1 discloses a method of (i) driving a mold by a servomotor and (ii) controlling the torque of the servomotor so that the weight of the mold is canceled and that the mold is in a pseudo-floating state.

CITATION LIST

Patent Literatures

Patent Literature 1
Japanese Patent Application Publication, Tokukai, No. 2009-190250 A (Publication Date: Aug. 27, 2009)
Patent Literature 2
Japanese Patent Application Publication, Tokukai, No. 2008-183827 A (Publication Date: Aug. 14, 2008)

SUMMARY OF INVENTION

Technical Problem

However, according to a method of controlling driving force for a mold by for example controlling the position and/or the speed of a drive shaft, controlling time with use of a timer or controlling temperatures, the following problem occurs. That is, reducing takt time to improve productivity makes it difficult to extract molding conditions. It becomes more difficult to extract the molding conditions as the area of a resin to be shaped becomes larger like a wafer-level lens. If the molding conditions are not extracted properly and the mold cannot follow the curing and shrinkage of a resin, the resin may have minute sink marks on its surface.

According also to the control method of Patent Literature 1, the following problem occurs. That is, since weight control means needs to be provided at a distance from the mold because of restrictions on curing means, increasing productivity reduces responsivity. This is likely to be a cause of improper molding.

The present invention has been made in view of the above problems, and an object of the present invention is to provide an optical element producing device and an optical element producing method each of which is capable of preventing occurrence of sink marks and improving surface accuracy of an optical functional surface while ensuring high productivity.

Solution to Problem

In order to attain the above object, an optical element producing device of the present invention is an optical element producing device for shaping a resin by sandwiching the resin between a pair of molds, including: a driving section configured to position a mold; a pressure detecting section configured to detect pressure exerted from the resin to the mold; and a controlling section configured to control, by causing the driving section to start operating at a time when the pressure detecting section has detected a state in which the pressure exerted to the mold is a negative pressure, the position of the mold so that the pressure exerted to the mold is increased to a predetermined positive pressure and thereafter the positive pressure is maintained.

According to the above configuration, at a time when the pressure exerted to the mold has reached a negative pressure, control is started so that the pressure exerted to the mold is increased to a predetermined positive pressure and thereafter the positive pressure is maintained. Note here that the time when the pressure exerted to the mold has reached a negative pressure is a point in time where the temperature of the resin has reached a gel point. By starting the control of pressure to the mold after the temperature of the resin has reached a gel point, it is possible to apply pressure to the resin within a suitable period during which the resin is in a soft solid state, and thus possible to easily extract setting conditions during the control even with a heating rate higher than conventional controlling methods. As such, a production method in accordance with the present invention makes it possible to achieve both a reduction in production time and improvement in surface accuracy of an optical functional surface.

In order to attain the above object, an optical element producing method of the present invention is an optical element producing method for shaping a resin by sandwiching the resin between a pair of molds, including the steps of: (1) applying the resin to one of the pair of molds; (2) causing the other of the pair of molds and the resin to contact with each other and curing the resin until the temperature of the resin reaches a gel point; (3) curing the resin, the step (3) including starting, at a time when the temperature of the resin has reached the gel point, control of the position of the one and/or the other of the pair of molds so that pressure exerted from the resin to the other of the pair of molds, which resin is curing and shrinking, is kept at a predetermined pressure.

According to the above configuration, the resin is cured while, after the temperature of the resin has reached a gel point, the position of the one and/or the other of the pair of molds is controlled so that the pressure exerted from the resin to the other of the pair of molds is kept at a predetermined pressure, which resin is curing and shrinking. This makes it possible to apply pressure to the resin during a suitable period during which the resin is in a soft solid state, and thus possible to easily extract setting conditions during the control even with a heating rate higher than conventional control methods. As such, a production method in accordance with the present invention makes it possible to achieve both a reduction in production time and improvement in surface accuracy of an optical functional surface.

Advantageous Effects of Invention

According to the present invention, control of the position of a mold is started, at a time when the temperature of a resin has reached a gel point, so that the pressure exerted to the mold is kept at a predetermined positive pressure. This makes it possible to apply pressure to the resin during a suitable period during which the resin is in a soft solid state, and thus possible to easily extract setting conditions during the control even with a heating rate higher than conventional control methods. As such, a production method in accordance with the present invention makes it possible to achieve both a reduction in production time and improvement in surface accuracy of an optical functional surface.

DESCRIPTION OF EMBODIMENTS

[Optical Element Producing Device]

Figure 1:
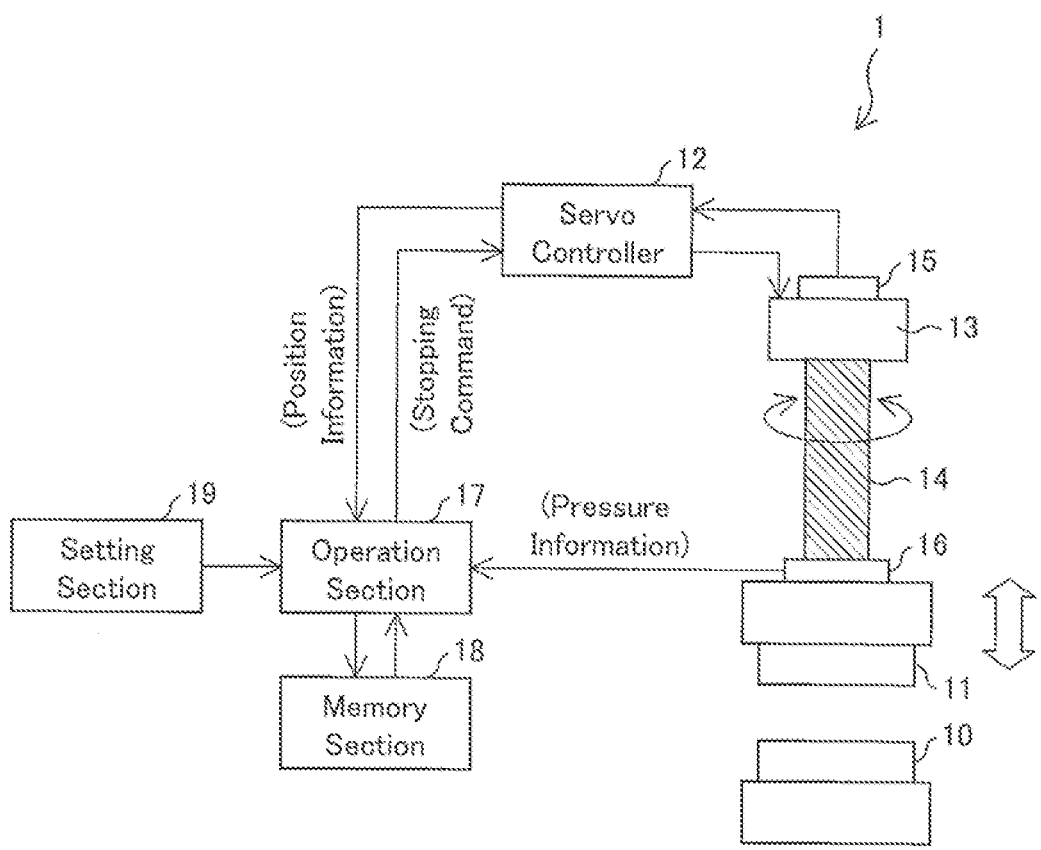
FIG. 1, showing an embodiment of the present invention, is a view schematically illustrating an optical element producing device.

The following description discusses embodiments of the present invention with reference to the drawings. FIG. 1 is a view schematically showing a configuration of an optical element producing device in accordance with the present embodiment.

As illustrated in FIG. 1, a production device 1 is configured to shape a resin by sandwiching the resin between a pair of molds 10 and 11 which face each other. The molds 10 and 11 are attached to a frame (not illustrated). The molds 10 and 11 are positioned movably along the frame so that the distance between the molds 10 and 11 is changeable relatively. Note here that (i) the lower mold 10 is fixed and (ii) the upper mold 11 is changeable in position when driven by a driving section constituted by a servomotor 13 and a ball screw 14. This enables the mold 11 to move closer to and away from the mold 10. It is needless to say that (a) the molds 10 and can have opposite configurations, i.e., the upper mold 11 is fixed and the lower mold 10 can move closer to and away from the mold 11 or (b) both the molds 10 and 11 can be movable. A direction in which the mold 11 and/or the mold 10 moves is set to a vertical direction.

An optical element producing device in accordance with the present invention is applicable also to production of a composite optical element. A composite optical element is a single optical element made up of (i) an optical element which serves as a base and is made of glass or plastic (such an optical element is hereinafter referred to as a base for short), and (ii) a synthetic resin layer to which a desired optical functional surface has been transferred. In a case where such a composite optical element is to be produced with the production device 1, a synthetic resin layer is formed by (a) applying a resin to a base which has been formed in a desired shape and (b) pressing a mold against the resin and curing the resin. That is, in this case, the mold 10 is the base which is to become part of the composite optical element, which base is attached to the production device 1. A specific amount of a resin is applied to the top of the base, and the mold 11 is pressed against the resin. The following description addresses an example in which a composite optical element is to be produced.

The mold 11 is driven by the servomotor 13 and the ball screw 14, which are controlled by a servo controller 12. The production device 1 further includes (i) an encoder 15 for detecting the position and the speed of the servomotor 13 and (ii) a load cell (pressure detecting section) 16 for detecting pressure exerted to the mold 11.

The production device 1 further includes, for executing a control program for controlling drive of the mold 11, an operation section (controlling section) 17, a memory section 18, and a setting section 19. The operation section 17 receives information on the position and the speed of the servomotor 13 from the encoder 15, and receives information on the pressure exerted to the mold 11 from the load cell 16. The memory section 18 stores therein a program and setting information for controlling drive of the molds. The setting section 19 is means for inputting the setting information which is to be stored in the memory section 18.

[Optical Element Producing Method]

Figure 2:
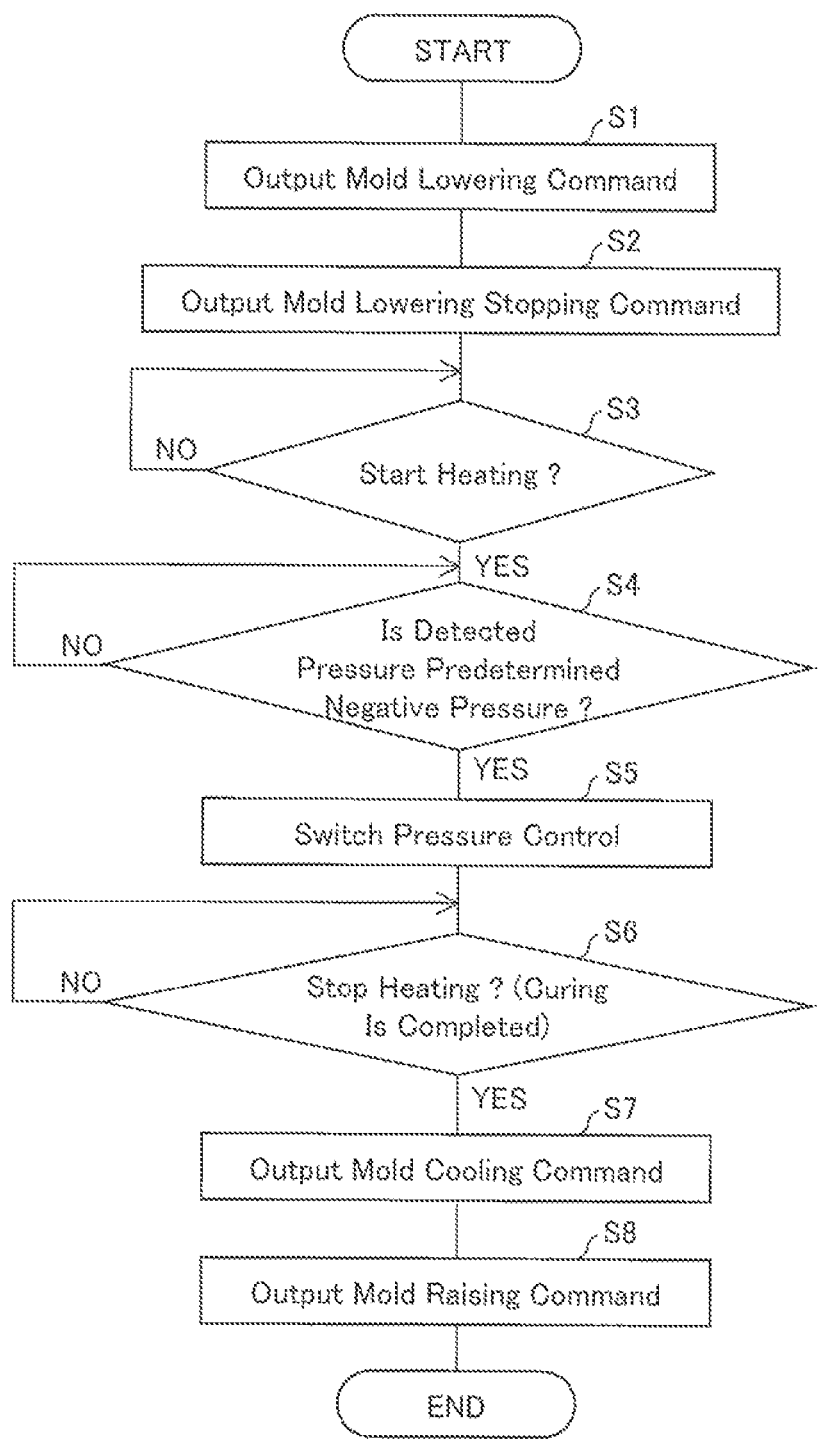
FIG. 2, showing an embodiment of the present invention, is a flowchart showing an optical element producing method.

The following description discusses an optical element producing method with reference to a flowchart shown in FIG. 2.

As a first step of producing a composite optical element with the production device 1, a base to which a specific amount of a resin has been applied and which serves as the mold 10 is attached to the production device 1 (step (1)). Note that, in a case where an optical element other than a composite optical element is to be produced, a resin is applied to the mold 10 which is part of the production device 1. Note here that a surface to which resin has been applied faces the mold 11. The resin can be a thermosetting resin or a photo-curable resin. The following description addresses an example in which a thermosetting resin is used.

In step (2), under the foregoing condition, the operation section 17 outputs a mold lowering command to the servo controller 12 to bring the mold 11 into contact with the resin (S1). While the mold 11 is being lowered, the load cell 16 detects pressure exerted to the mold 11, and inputs pressure information, which indicates the pressure thus detected, to the operation section 17. The operation section 17 monitors the pressure exerted to the mold 11 on the basis of the pressure information input from the load cell 16, and, when the pressure reaches a positive pressure, outputs a mold lowering stopping command to the servo controller 12 (S2) to stop the movement of the mold 11. When the mold 11 first makes contact with the resin, pressure exerted is not so high because the resin is in liquid form. Therefore, it is preferable that the pressure at which the movement of the mold 11 is to be stopped is set to a pressure as close as possible to zero. For example, it is possible to consider stopping the movement of the mold 11 at the detection of a minimum detectable positive pressure by the load cell 16. Further, when the movement of the mold 11 has been stopped by the mold lowering stopping command, the position of the servomotor 13 at this point in time is detected by the encoder 15, and position information which indicates the position thus detected is stored in the memory section 18 via the operation section 17.

When the movement of the mold 11 has been stopped temporarily like above, heating is started to cure the resin (YES in S3). Further, throughout the step (2), the load cell 16 keeps detecting the pressure exerted to the mold 11, and inputting pressure information, which indicates the pressure thus detected, to the operation section 17. The operation section 17 monitors the pressure exerted to the mold 11 on the basis of the pressure information, and, when the pressure has reached a negative pressure (YES in S4), switches the way of controlling the pressure exerted to the mold 11 (S5). That is, until the negative pressure is detected, the mold 11 is (i) in a stopped state or (ii) under positional control that does not involve pressure control such as control to maintain the pressure exerted to the mold 11 constant. Such positional control is for example control to lower the mold 11 at a certain speed.

Figure 3:
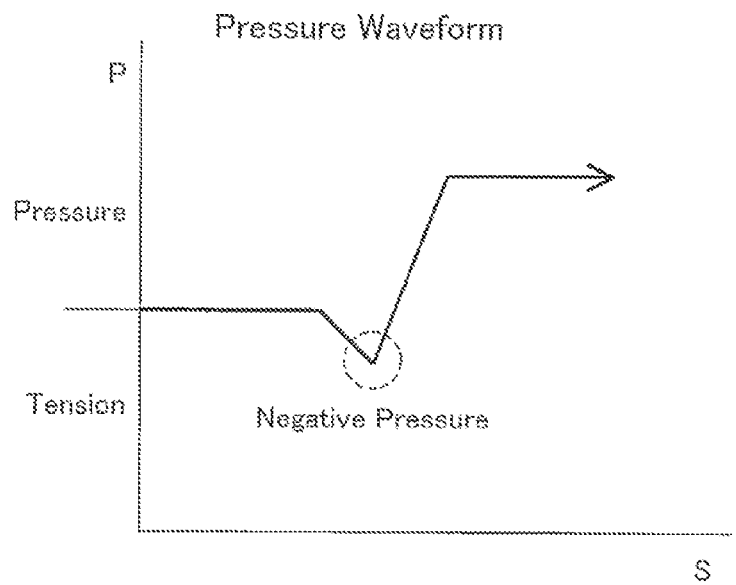
FIG. 3 is a view showing a pressure waveform before and after a negative pressure is detected in an optical element producing method of the present embodiment.

When the negative pressure is detected, the process proceeds to the step (3). In the step (3), the servo controller 12 drives the mold 11 while carrying out pressure control such that (i) the pressure exerted to the mold 11 is increased to a predetermined positive pressure and (ii) the positive pressure is maintained until the resin is completely cured (see FIG. 3). This causes the mold 11 to be driven and controlled such that the mold 11 applies a predetermined pressure to the resin while following curing and shrinkage of the resin. Note that the pressure control after the negative pressure is detected, which pressure control is for maintaining the pressure exerted to the mold 11 at a predetermined positive pressure, can be achieved by carrying out feedback control in which for example output from the load cell 16 is input to the operation section 17 and the output is maintained at a predetermined value.

Alternatively, the pressure control, which is to maintain the pressure exerted to the mold 11 at a predetermined positive pressure, can be carried out by controlling the position or the speed of the servomotor on the basis of setting information stored in the memory section 18 beforehand. Specifically, the pressure control can be carried out by (i) storing setting information in the memory section 18 beforehand, which setting information is a change in the position or the speed of the servomotor over a predetermined period from the start of heating and (ii) controlling the position or the speed of the servomotor on the basis of the setting information. In this case, the position of the servo motor can be controlled on the basis of its position after a certain period of time from the start of heating. The position is calculated by adding, to an initial position of the mold 11 before heating, the change in position of the servomotor which change is stored as setting information. The setting information can be obtained by (a) producing optical elements experimentally under a plurality of different conditions and (b) using a condition under which a good optical element is obtained.

When the resin has been cured and the heating is stopped (YES in S6), the operation section 17 outputs a mold cooling command to cooling means (not illustrated) (S7). Then, when the mold 11 is cooled to a specific temperature, the operation section 17 outputs a mold raising command to the servo controller 12 (S8). After that, a composite optical element made up of the base and a synthetic resin layer (made of cured resin) is released from the mold 11. This completes the composite optical element.

[Effects Brought about by the Production Method]

Figure 4:
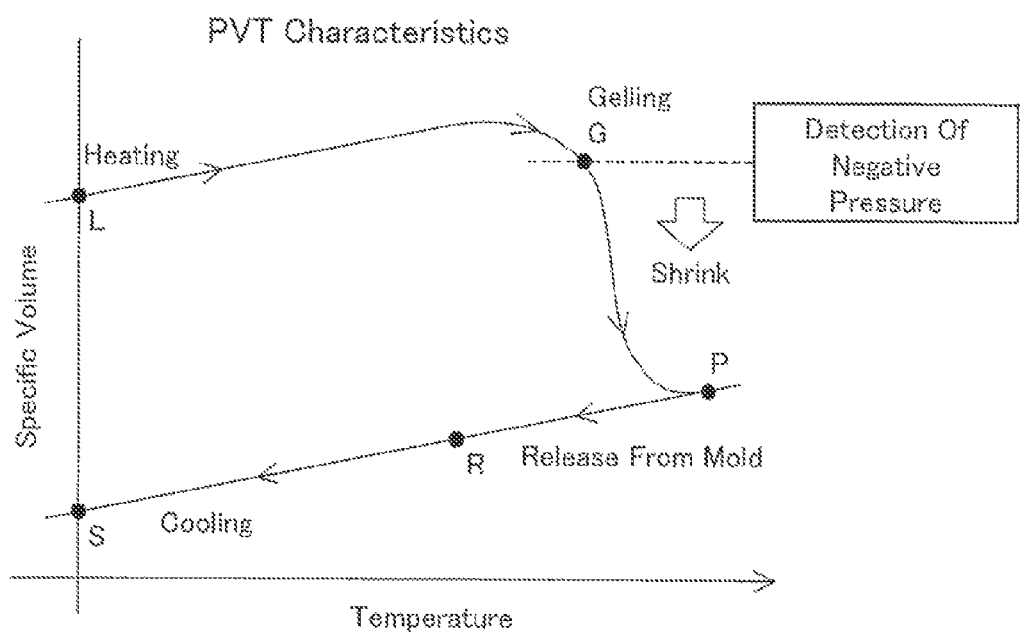
FIG. 4 is a view showing PVT characteristics of a resin to be heated in the optical element producing method of the present embodiment.

The state of a resin being heated changes in accordance with PVT characteristics shown in FIG. 4. The PVT characteristics are indicative of a relation among pressure (P), specific volume (V) and temperature (T). As a reaction of the resin proceeds by heating, the state of the resin changes from liquid to unstable solid, from unstable solid to soft solid, and then from soft solid to hard solid.

According to the molding process shown in FIG. 4, from an initial condition (L) to a gel point (G), the resin undergoes thermal expansion due to heating while shrinking due to a curing reaction before gelling. From the gel point (G) to a curing process point (P), the resin is in tight contact to a mold and thus dimensional changes of the resin in the in-plane direction are restricted. At the curing process point (P), the resin undergoes stress relaxation depending on the curing time. From the curing process point (P) to a release point (R), dimensional changes of the resin are restricted by the mold. From the release point (R) to a mold completion point (S), the resin undergoes dimensional changes, i.e., the resin releases remaining stress (shrinkage due to cooling). In this molding process, a difference between the dimensions of the mold and the dimensions of the resin at the completion of molding is effective shrinkage.

In order to transfer a shape from the mold 11 to a resin, it is necessary to apply pressure to the resin while the resin is in the soft solid state. In this regard, according to a conventional method for controlling driving force, when the heating rate is increased, it becomes difficult to appropriately set a timing to start applying pressure to the resin. This is because, according to the conventional method, the control is started from the start of heating. If the application of pressure to the resin is started too early, the resin deforms to too large an extent because the pressure is exerted before the resin turns into the soft solid state. If the application of pressure to the resin is started too late, the resin becomes prone to improper molding (improper transfer) because the resin is overcured at the start of pressure application. Therefore, according to the conventional method, it is necessary to carry out the molding with a suppressed heating rate.

Figure 5:
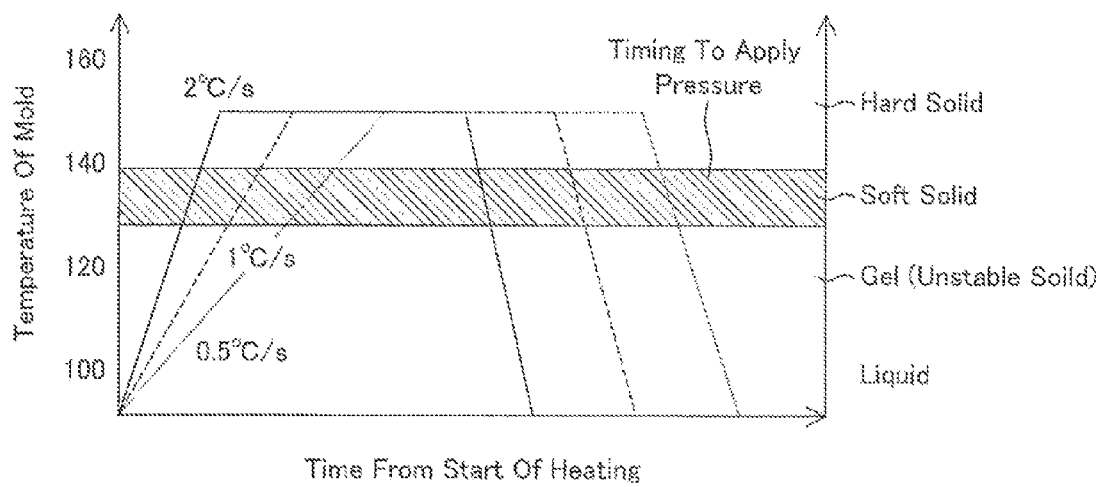
FIG. 5 is a graph showing a heating-rate-dependent relationship between time from the start of heating and temperatures of a mold.
Figure 6:
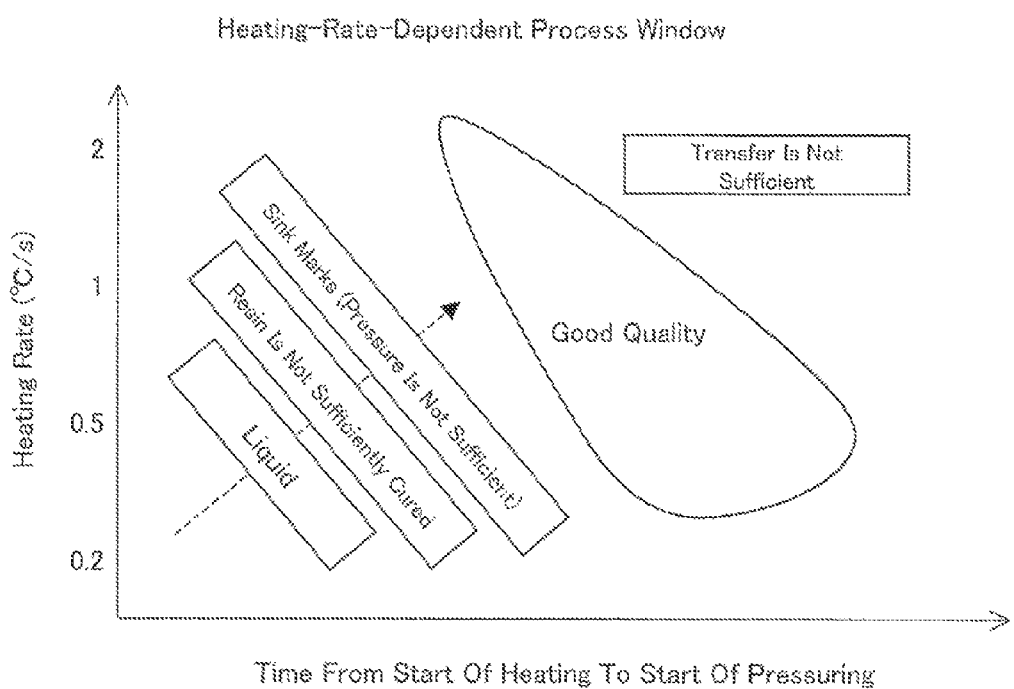
FIG. 6 shows a heating-rate-dependent process window.

For example, assume that pressure should be applied to the resin within a period during which the temperature of the mold is between 130° C. and 140° C. (see FIG. 5). In a case where the heating rate is 2° C./s, the period within which the pressure should be applied is only 5 seconds. In contrast, in a case where the heating rate is 0.5° C./s, this period is 20 seconds. This means that, although increasing the heating rate improves productivity, the period within which pressure should be applied to the resin decreases, and thus it becomes difficult to appropriately set a timing to start application of pressure to the resin. FIG. 6 shows a heating-rate-dependent process window. It is clear from FIG. 6 that the period from the start of heating to the start of pressure application has (i) a smaller margin for obtaining good products as the heating rate increases and (ii) a larger margin as the heating rate decreases.

A production method in accordance with the present embodiment is arranged such that (i) the pressure exerted to the mold 11 is monitored and (ii) when the pressure has reached a negative pressure, the control of drive of the servomotor 13 (control of pressure to the mold 11) is started. The time when the pressure to the mold 11 reaches a negative pressure is the gel point (G) shown in FIG. 4. By starting the control of drive from the gel point (G), it is possible to apply a predetermined pressure to the resin during a suitable period during which the resin is in the soft solid state. This makes it possible, even with a heating rate higher than a conventional method, to easily extract setting conditions during the control of drive. This makes it possible for the production method in accordance with the embodiment to achieve both a reduction in production time and improvement in surface accuracy of an optical functional surface. According to the present embodiment, sink marks on the optical functional surface are prevented and surface accuracy of the optical functional surface is improved while high productivity is ensured, even with a configuration in which a thermosetting resin is used and the heating rate by a heater is set at 2° C./s.

The foregoing description discussed a case where a thermosetting resin is used. In a case where a photo-curable resin is used, it is possible to improve productivity by accelerating curing of a resin by increasing the intensity of light with which the resin is irradiated for curing. According to an optical element production method in accordance with the present embodiment, also in a case where a photo-curable resin is used, it is possible to prevent sink marks on an optical functional surface and improve surface accuracy of the optical functional surface while ensuring high productivity.

Note that each section and each step of an optical element producing device of the foregoing embodiment can be realized in the following manner. That is, operation means such as a CPU executes a program stored in memory means such as a ROM (Read Only Memory) and/or a RAM to thereby control input means such as a keyboard, output means such as a display, or communication means such as an interface circuit. Accordingly, it is only necessary that a computer including such means reads a recording medium in which the program is stored and executes the program to realize each function and each process of a production device of the present embodiment. Further, by storing the program in a removable recording medium, it is possible to realize, on any computer, each function and each process described above.

The recording medium can be for example (i) a memory (not illustrated) such as a ROM so that processes can be carried out by a microcomputer or (ii) a medium that is readable by being inserted into a program reading device (not illustrated) which is provided as an external storage.

In any case, it is preferable that a stored program is constructed so as to be accessed and executed by a microprocessor. Moreover, it is preferable to employ a system in which (i) a program is read out, (ii) the program thus read out is downloaded to a program storage area of a microcomputer, and (iii) the program is executed. Note that a program for download is stored in a main device in advance.

Examples of the storage medium include recording media for permanently storing a program therein, which recording media are separable from a main body of a device. Examples of such recording media include: tape media such as magnetic tapes and cassette tapes; disk media such as magnetic disks including flexible disks and hard disks and discs including CD, MO, MD, and DVD; card media such as IC cards (including memory cards); and semiconductor memories such as mask ROM, EPROM (Erasable Programmable Read Only Memory), EEPROM (Electrically Erasable Programmable Read Only Memory), and flash ROM.

In a case of a system configuration connectable with a communications network such as the Internet, it is preferable that the recording medium is a recording medium for temporarily storing a program, e.g., the program is downloaded from a communications network.

Furthermore, in a case where a program is downloaded from a communications network like above, it is preferable that a program for download is stored in a main device in advance or is installed from a separately provided recording medium.

The present invention is not limited to the description of the embodiments above, but may be altered by a skilled person within the scope of the claims. An embodiment based on a proper combination of technical means disclosed in different embodiments is encompassed in the technical scope of the present invention.

The optical element producing device in accordance with an embodiment of the present invention can be configured such that: the optical element is a composite optical element obtained by forming, on a base which has an optical function, a synthetic resin layer to which a desired optical functional surface has been transferred; and one of the pair of molds serves as the base.

The optical element producing method in accordance with an embodiment of the present invention can be configured such that: the pressure exerted from the resin to the other of the pair of molds is monitored throughout the step (2); at detection of a state in which the pressure exerted to the other of the pair of molds is a negative pressure, the step (2) is switched to the step (3); in the step (3), the position of other of the pair of molds is controlled so that the pressure exerted to the other of the pair of molds is increased to a predetermined positive pressure and thereafter the positive pressure is maintained.

The optical element producing method in accordance with an embodiment of the present invention can be configured such that: the optical element is a composite optical element obtained by forming, on a base which has an optical function, a synthetic resin layer to which a desired optical functional surface has been transferred; and one of the pair of molds, to which one the resin is applied, serves as the base.

A control program in accordance with an embodiment of the present invention is a program for controlling an optical element producing device for shaping a resin by sandwiching the resin between a pair of molds, the optical element producing device including: a driving section configured to position a mold; a pressure detecting section configured to detect pressure exerted to the mold; and a computer for controlling the driving section, the program causing the computer to carry out a function of controlling, by causing the driving section to start operating at a time when the pressure detecting section has detected a state in which the pressure exerted from the resin to the mold is a negative pressure, the position of the mold so that the pressure exerted to the mold is increased to a predetermined positive pressure and thereafter the positive pressure is maintained.

A recording medium in accordance with an embodiment of the present invention is a non-transitory computer-readable recording medium in which the control program is stored.

INDUSTRIAL APPLICABILITY

The present invention is usable in (i) production of an optical element made of a resin to which a desired optical functional surface has been transferred and (ii) production of a composite optical element obtained by forming, on an optical element which is made of glass or plastic and serves as a base, a synthetic resin layer to which a desired optical function surface has been transferred.

REFERENCE SIGNS LIST

10 Mold (Base)
11 Mold
12 Servo controller
13 Servomotor (Driving section)
14 Ball screw (Driving section)
15 Encoder
16 Load cell (Pressure detecting section)
17 Operation section (Controlling section)
18 Memory section (Controlling section)
19 Setting section

The invention claimed is:
1. An optical element producing method for shaping a resin by sandwiching the resin between a pair of molds, comprising the steps of:
   (1) applying the resin to one of the pair of molds;
   (2) causing the other of the pair of molds and the resin to contact with each other and curing the resin until the temperature of the resin reaches a gel point; and

(3) curing the resin, the step (3) including starting, at a time when the temperature of the resin reaches the gel point, control of the position of the one and/or the other of the pair of molds so that pressure exerted from the resin to the other of the pair of molds, which resin is curing and shrinking, is kept at a predetermined pressure;

the pressure exerted from the resin to the other of the pair of molds is monitored throughout the step (2);

at detection of a state in which the pressure exerted to the other of the pair of molds is a negative pressure, the step (2) is switched to the step (3); and in the step (3), the position of the one and/or the other of the pair of molds is controlled so that the pressure exerted to the other of the pair of molds is increased to a predetermined positive pressure and thereafter the positive pressure maintained.

2. The optical element producing method as set forth in claim 1, wherein:

the optical element is a composite optical element obtained by forming, on a base which has an optical function, a synthetic resin layer to which a desired optical functional surface has been transferred; and one of the pair of molds, to which one the resin is applied, serves as the base.

3. The optical element producing method as set forth in claim 1, wherein step (2) comprises stopping movement of the one and/or the other of the pair of molds at the detection of a minimum detectable positive pressure; and thereafter staring to cure the resin.

* * * * *